Figure 1:
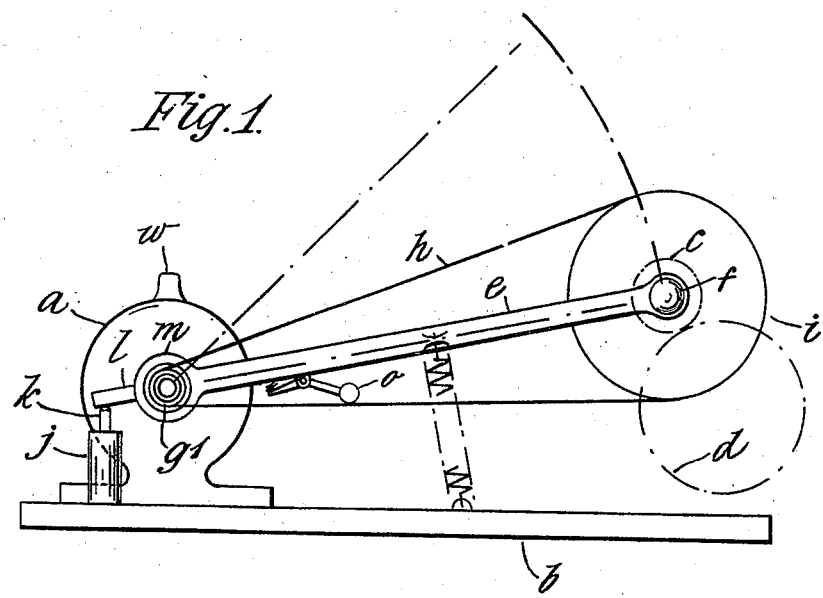

R. B. MATTHEWS.
PORTABLE DRIVING APPARATUS.
APPLICATION FILED JULY 19, 1909.

984,953.

Patented Feb. 21, 1911.

2 SHEETS—SHEET 1.

Witnesses

Inventor
Richard B. Matthews
By James L. Norris

R. B. MATTHEWS.
PORTABLE DRIVING APPARATUS.
APPLICATION FILED JULY 19, 1909.
984,953.
Patented Feb. 21, 1911.
2 SHEETS—SHEET 2.
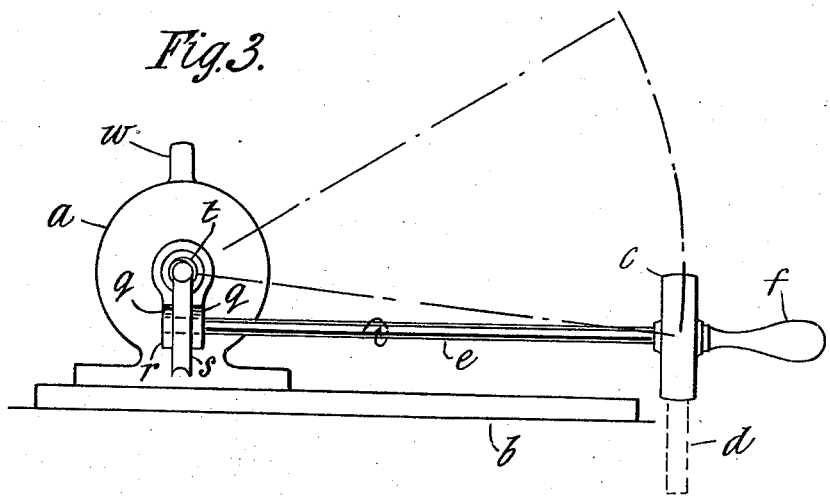
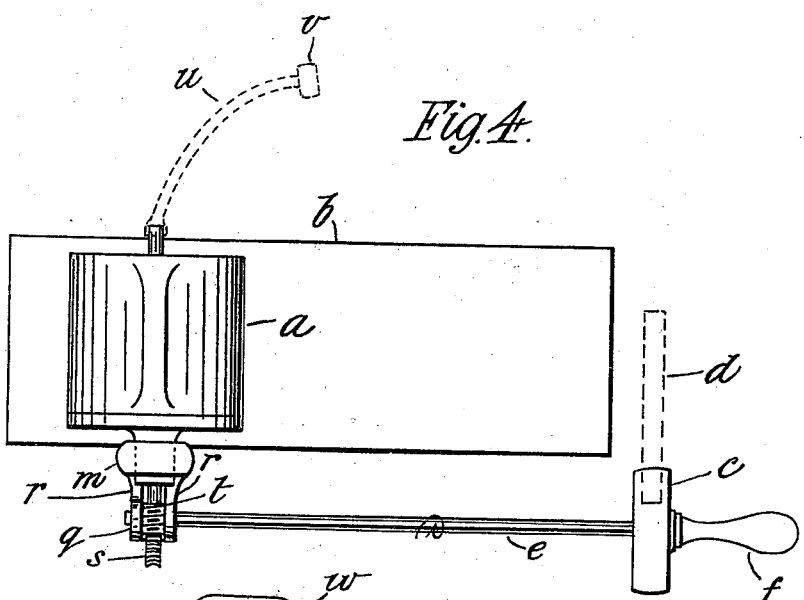
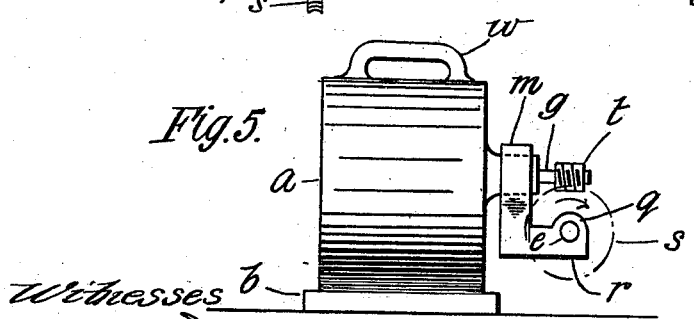
Witnesses
Inventor
Richard B. Matthews
By James L. Norris
Atty

_UNITED STATES PATENT OFFICE._

RICHARD BORLASE MATTHEWS, OF SWANSEA, ENGLAND.

PORTABLE DRIVING APPARATUS.

984,953.   Specification of Letters Patent.   Patented Feb. 21, 1911.

Application filed July 19, 1909. Serial No. 508,529.

_To all whom it may concern:_

Be it known that I, RICHARD BORLASE MATTHEWS, a subject of the King of Great Britain, residing at 9 Cambrian Place, Swansea, in the county of Glamorgan, Wales, England, have invented certain new and useful Improvements in Portable Driving Apparatus, of which the following is a specification.

This invention relates to means for applying motive power to the driving of machinery, and has reference more particularly to a portable arrangement suitable for example for domestic use in the driving of light machines such as sewing machines, mincers, knife-cleaning machines, wringers, or the like.

The main object of the invention is to provide an arrangement which shall not require any skilled attention in setting it to work, which can be simply lifted off one machine which it may happen to be driving and placed upon or in proximity to another, and will then serve instantly also to drive the latter without there being any necessity to connect or alter any mechanical couplings or clutch devices.

To this end the improved system comprises an electric or other suitable light motor mounted portably on a base plate and arranged to drive, through suitable gearing carried on or supported from the same base plate or the motor frame, a friction pinion or gear wheel which forms the actual transmission or gearing device from the portable apparatus to the machine to be driven. The latter in its turn is also provided with a wheel or driving disk either in addition to or instead of an ordinary operating handle. This disk or wheel is adapted to give a frictional drive with the aforesaid friction pinion of the portable apparatus when the two are pressed together. The said friction wheel is mounted at the end of a radius arm which is provided with a suitable handle or knob whereby it can be raised, lowered or otherwise adjusted when placing the apparatus in position and by pressing on which the friction or grip can also be increased. In this way, by merely placing the portable motor apparatus near the machine to be driven, in such a way that the friction pinion presses against or rests upon the driving disk, a proper drive is obtained between the electric or other motor and the machine, without any necessity for manipulating clutches or mechanical gearing devices of the usual kind, and various degrees of grip or adhesion may be obtained by pressing by hand or otherwise upon the handle or knob of the radius arm which carries the pinion.

In order that the invention may be clearly understood and readily carried into effect reference will now be had to the accompanying drawings in which:—

Figure 2:
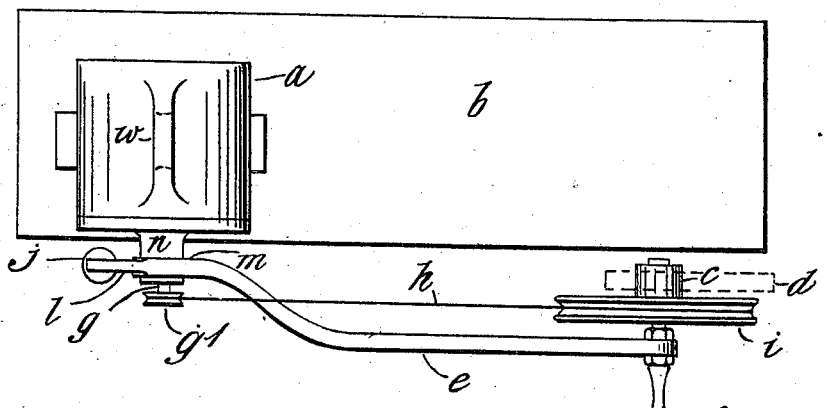

Figure 1 is a side view, and Fig. 2 a plan of one arrangement embodying the present improvements, in which the motion is transmitted to the friction pulley by means of a band or cord. Figs. 3 and 4 are corresponding views of a modification, wherein the transmission is by a worm gear and shaft, in order to afford a greater degree of speed reduction. Fig 5 is an end view of this modification illustrating more especially the arrangement of the worm gear.

In these drawings:—$a$ is the electric or other motor and $b$ is the base thereof.

$c$ is the friction pinion or gear wheel by which the motion is transferred to the machine (not shown) to be driven, this latter being provided with the wheel or driving disk such as $d$, with which the pinion $c$ engages, either in addition to or instead of the ordinary handle for turning it.

$e$ is the radius arm at the end of which the wheel or pinion $c$ is mounted, and $f$ is the handle or the like by which this arm is turned on its pivot into the desired position, and by which also the pinion $c$ is pressed against the wheel $d$.

The pinion $c$ and the wheel $d$ are usually intended to be smooth and to drive simply by friction, but obviously they may be roughened or even be toothed if desired.

Referring more particularly to the arrangement shown in Figs. 1 and 2, the radius bar or arm $e$ carrying the friction disk or pinion is mounted as hereinafter described concentrically with the motor axle $g$. A small pulley or pinion $g'$ on the latter axle serves by means of a band $h$ (or a chain) or the like to drive a larger pulley or pinion $i$ connected fast with the friction pinion $c$. In any convenient way, for instance by a compression spring in a box $j$ acting through a rod $k$ on a tail piece $l$ on the radius bar, the latter is caused to press the friction pinion downward with such force that when resting on the driving disk $d$ of the machine to be operated, it will serve to drive the same efficiently. The radius arm may be mounted direct on the motor spindle, but is preferably mounted as shown upon a boss or sleeve $m$ carried by one of the bearings $n$ of the electro-motor. In some cases the arm might be mounted upon a separate piece or bracket on the motor base plate, care being however, taken to keep it co-axial or practically so with the motor spindle. By this arrangement it will be readily understood that the angular swinging of the radius arm $e$ on its pivot (indicated by the dot and dash lines) does not in any way affect the tension of the driving band $h$ and therefore does not disturb the working of the apparatus in any way, or necessitate re-adjustment of any of the parts.

The driving band, chain or the like $h$ is preferably inclosed in a suitable protecting casing (not shown) resembling the gear case of a bicycle for instance. In order to take up any slack in the driving band due to stretching for example while in use, a suitable idler pinion $o$ may be provided which may be carried by a pivoted piece mounted on the radius arm acted upon by a spring which tends to press the idler against the slack side of the belt or band.

The base-plate $b$ may be of wood for instance and may extend beneath the end of the arm, so as to support the pulley $i$, when the apparatus is not in use, and also to support the machine to be driven. Moreover the arm at its free extremity may be provided with a stop piece or buffer adapted to prevent damage in case it should be accidentally released so that it descends suddenly with a sharp blow. In some instances the end of the gear case may also be strengthened with the same object.

The above arrangement gives a reduction of speed between the motor and the friction pinion, due to the relative diameters of the pulleys $g'$ and $i'$, but in some cases a greater reduction of speed may be desirable and to this end the arrangement illustrated in Figs. 3 to 5 may be employed. In this arrangement the radius bar or arm $e$ consists of a rotary shaft one end of which is mounted in a pair of bearings $q$ carried by two cheek plates $r$ projecting laterally from the lower part of the boss or sleeve $m$. In the part of the shaft between the cheek plates $r$ is mounted a worm-wheel $s$ which is driven (Fig. 5) by a worm $t$ on the motor axle $g$ and thus gears down very considerably the speed which is transmitted to the rotary radius bar or shaft $e$.

The friction pinion $c$ is mounted directly on the outer end of this revolving bar or shaft $e$, and the handle $f$ is arranged in line with the latter but mounted after the manner of a loose-pulley so that it shall not partake of the rotary movement when being held in the hand, for instance to press it on to the driving disk $d$.

In some cases, the end of the motor spindle opposite the radius arm may be adapted to be connected to a length of flexible shafting $u$ which may carry a high speed tool such as a drill, a polishing or buffing wheel $v$, a rotary brush or the like.

For the purpose of obtaining greater portability the apparatus, comprising the motor, radius arm and their associated parts may all be adapted to be lifted off the aforesaid base plate in one piece, and be so adjusted that they will balance approximately level when held by a handle formed on or secured to the top of the motor frame, as indicated at $w$.

To permit of easy detachment from the base plate, the base of the motor may be connected to the base plate by any suitable readily detachable devices. Where therefore it is required to detach the motor to move the apparatus to another machine, it is only necessary to unfasten these devices, thereby instantly setting free the motor without its being necessary to do any unscrewing or other troublesome mechanical disconnection.

What I claim and desire to secure by Letters Patent of the United States is:—

1. In a portable driving apparatus, the combination of a light motor, a swinging radius arm movable around but independent of the axle of the motor in its movements, a driving pinion carried by said arm, and means associated with said arm for driving said pinion from said motor.

2. In a portable driving apparatus, the combination of a light motor, a swinging radius arm having its center of radial motion coincident with the axis of said motor, a driving pinion carried by said arm, means associated with said arm for driving said pinion from said motor, and means tending to bring the radial arm always in its normal position, substantially as described.

3. In a portable driving apparatus, the combination of a light motor, a swinging radius arm movable around the axis of said motor, a driving pinion carried by said arm, and means for driving said pinion at a speed lower than that of said motor, substantially as described.

4. In a portable driving apparatus, the combination of a light motor, a swinging radius arm movable around the axis of said motor as a center, a friction gear wheel at the outer end of said arm, and means for driving said friction gear wheel from the said motor shaft, substantially as described.

5. In a portable driving apparatus, the combination of a light motor, a swinging radius arm movable around the axis of said motor as a center, a friction gear wheel at the outer end of said arm, and speed reducing gearing for driving said friction gear wheel, substantially as described.

In testimony whereof I affix my signature in presence of two witnesses.

RICHARD BORLASE MATTHEWS.

Witnesses:
 H. D. JAMESON,
 F. L. RAND.